United States Patent
Chen et al.

(10) Patent No.: US 9,697,101 B1
(45) Date of Patent: Jul. 4, 2017

(54) DETECTING ERRORS IN WEB APPLICATION RUNTIME ENVIRONMENTS

(71) Applicant: International Business Machines Corporation, Armonk, NY (US)

(72) Inventors: Wei Qiong Chen, Shenzhen (CN); Xiao Hui Dong, Beijing (CN); Xin Peng Liu, Beijing (CN); Jing Jing Pan, Beijing (CN); Qiao Yun Sun, Beijing (CN); Shu Chao Wan, Beijing (CN); Liang Wang, Beijing (CN); Yue Wang, Beijing (CN); Yu Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/271,030

(22) Filed: Sep. 20, 2016

(51) Int. Cl.
*G06F 9/44* (2006.01)
*G06F 15/16* (2006.01)
(Continued)

(52) U.S. Cl.
CPC ...... *G06F 11/3612* (2013.01); *G06F 11/3632* (2013.01); *H04L 67/02* (2013.01)

(58) Field of Classification Search
CPC ......... G06F 17/30884; G06F 17/30896; G06F 17/30899; G06F 9/4443; G06F 11/3612;
(Continued)

(56) References Cited

U.S. PATENT DOCUMENTS 7,730,135 B2 * 6/2010 Petrovykh ............ G06Q 10/107 370/352
7,929,464 B2 * 4/2011 Petrovykh ............... H04L 12/58 370/270

(Continued)

FOREIGN PATENT DOCUMENTS

WO    2015172326 A1    11/2015

OTHER PUBLICATIONS

Li et al., SymJS: automatic symbolic testing of JavaScript web applications, Nov. 2014, 11 pages.*

(Continued)

*Primary Examiner* — Thuy Dao
(74) *Attorney, Agent, or Firm* — Patterson + Sheridan, LLP

(57) ABSTRACT

Systems, methods, and computer program products to perform an operation comprising receiving a user action script, a first callback queue, and an asynchronous operation queue generated based on a first execution instance of a web application, simulating the first execution instance of the web application, comprising: invoking a second execution instance of the web application, simulating each user action of a plurality of user actions specified in the user action script, based on a plurality of callback functions specified in the first callback queue, simulating each asynchronous operation of a plurality of asynchronous operations specified in the asynchronous operation queue based on the plurality of callback functions specified in the first callback queue, and generating a second callback queue based on the simulated plurality of user actions and asynchronous operations.

18 Claims, 10 Drawing Sheets

(51) Int. Cl.
*H04L 29/08* (2006.01)
*G06F 11/36* (2006.01)

(58) Field of Classification Search
CPC ... G06F 9/4446; G06Q 30/0267; H04L 67/02; H04L 67/10; H04L 41/22
See application file for complete search history.

(56) References Cited

U.S. PATENT DOCUMENTS

| | | | |
|---|---|---|---|
| 8,433,733 | B2 | 4/2013 | Sayed et al. |
| 8,955,114 | B2 | 2/2015 | Dolan-Gavitt et al. |
| 8,990,410 | B1* | 3/2015 | Damodaran ........ H04L 12/2602 707/602 |
| 9,031,087 | B2* | 5/2015 | Petrovykh ............ H04L 12/58 370/395.42 |
| 9,164,876 | B2 | 10/2015 | He et al. |
| 2006/0117222 | A1* | 6/2006 | Shen ................... G06F 8/31 714/38.14 |
| 2011/0055683 | A1* | 3/2011 | Jiang ............... G06F 17/30899 715/234 |
| 2011/0264787 | A1* | 10/2011 | Mickens ............ G06F 11/3414 709/224 |
| 2014/0280522 | A1* | 9/2014 | Watte ................. H04L 51/04 709/203 |
| 2014/0351796 | A1* | 11/2014 | Gur-Esh ............ G06F 11/3644 717/126 |
| 2015/0095763 | A1 | 4/2015 | Wang et al. |

OTHER PUBLICATIONS

T. Hussain et al., Co-Simulation for Performance Evaluation of an Enterprise's Web Storage Systems, Dec. 2013, 4 pages.*
Guo, Z. et al., "R2: An Application-Level Kernel for Record and Replay", (2008) USENIX Association, 8th USENIX Symposium on Operating Systems Design and Implementation, pp. 193-208 <https://www.usenix.org/legacy/event/osdi08/tech/full_papers/guo/guo.pdf>.
Wikipedia, "Firebug (software)", retrieved Sep. 14, 2016, 4 pages <https://en.wikipedia.org/wiki/Firebug_(software)>.
StarBase Computer Services Ltd., © 2015, retrieved Sep. 15, 2016, 4 pages <http://www.starbase.co.uk/what-we-sell/ibm-rational-green-hat/ibm-rational-test-workbench.html>.

* cited by examiner

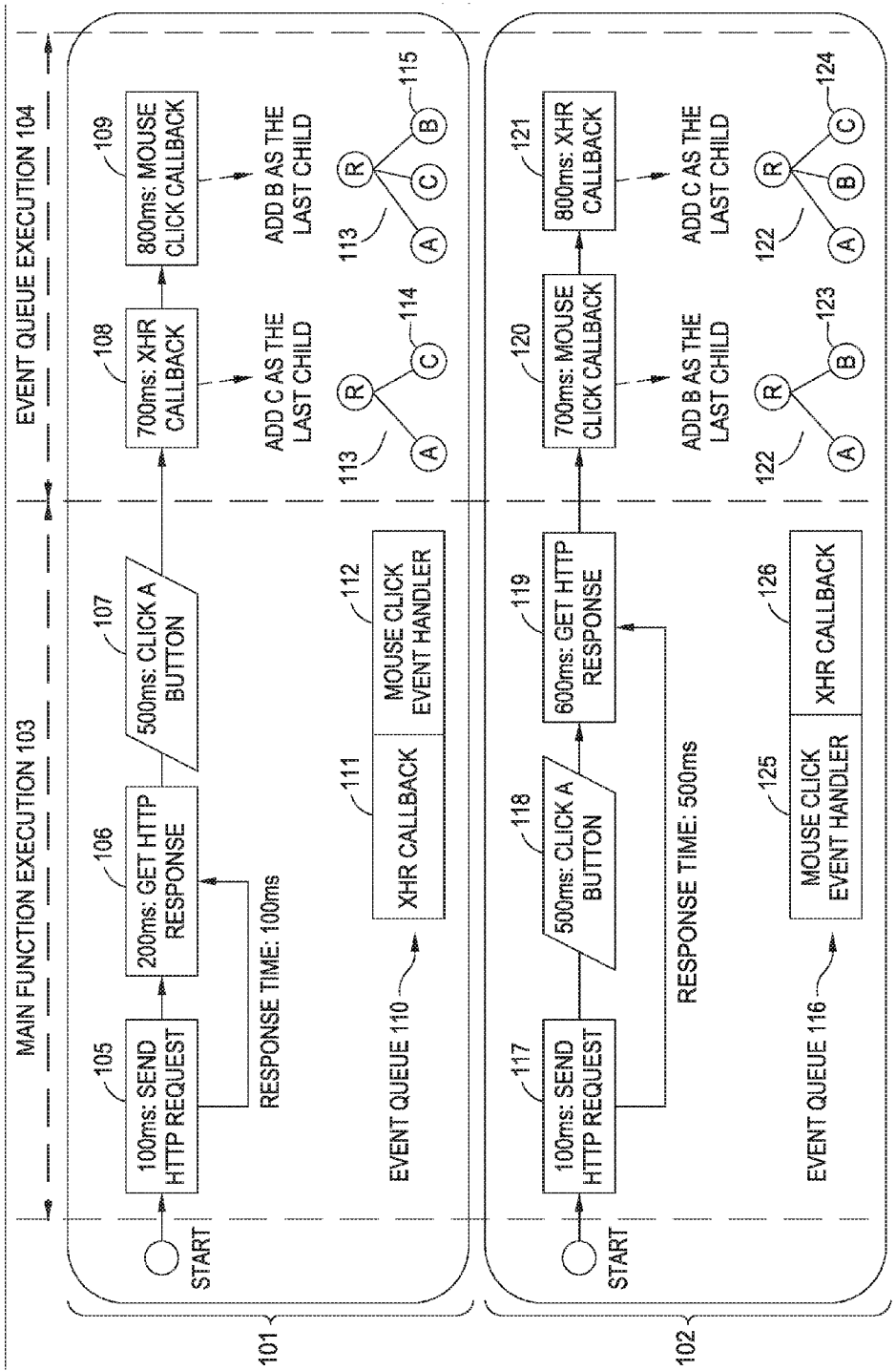

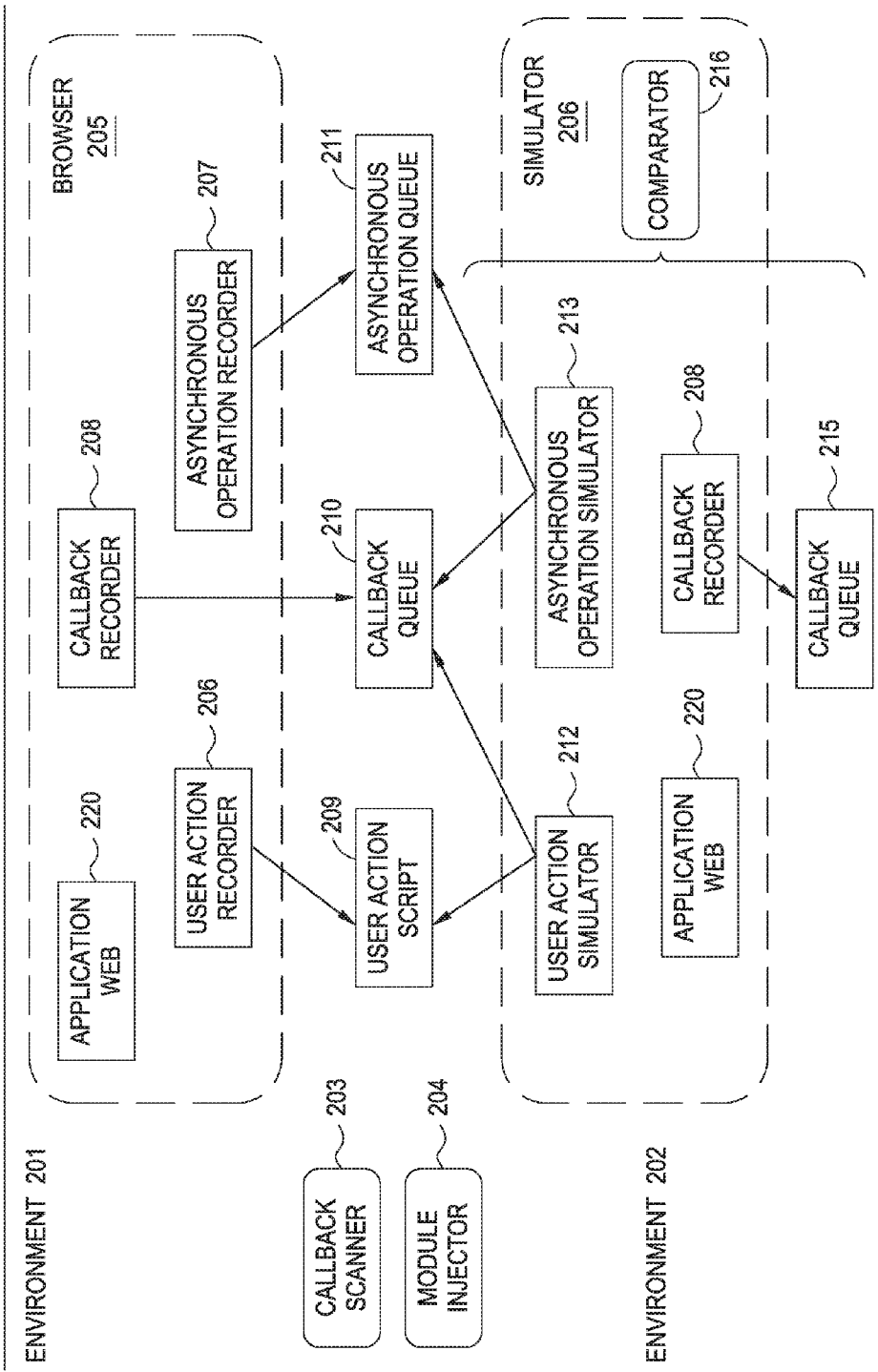

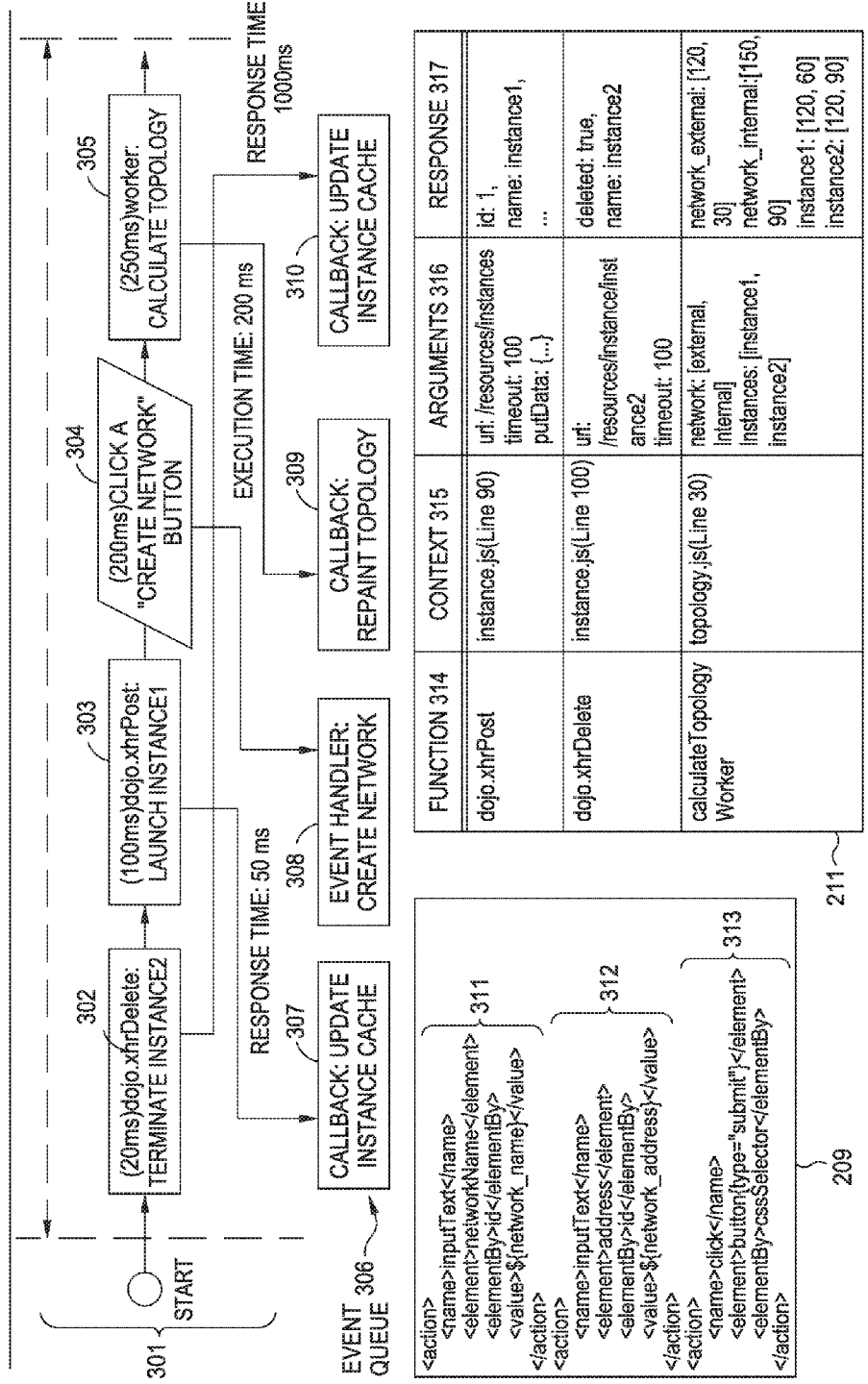

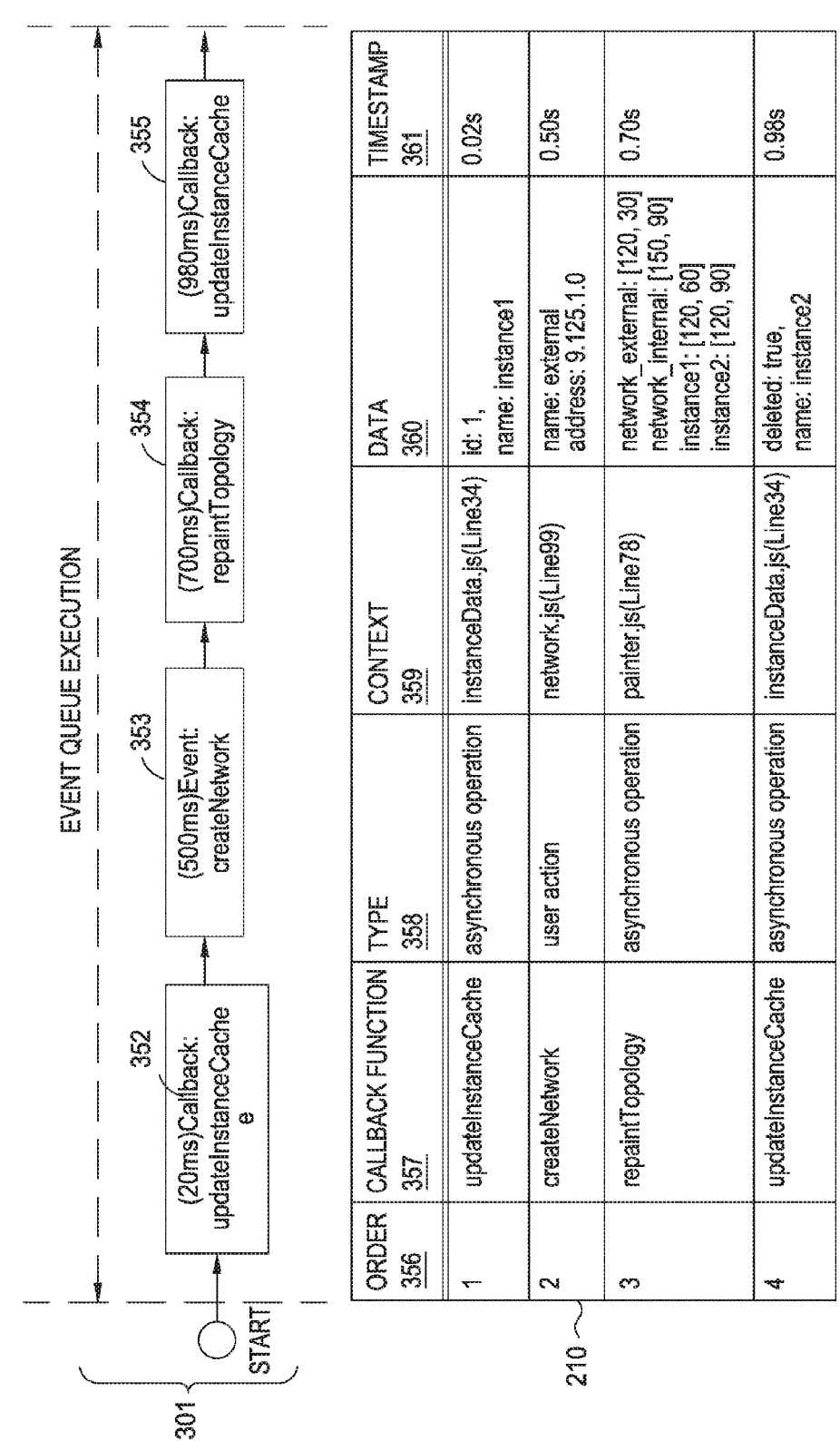

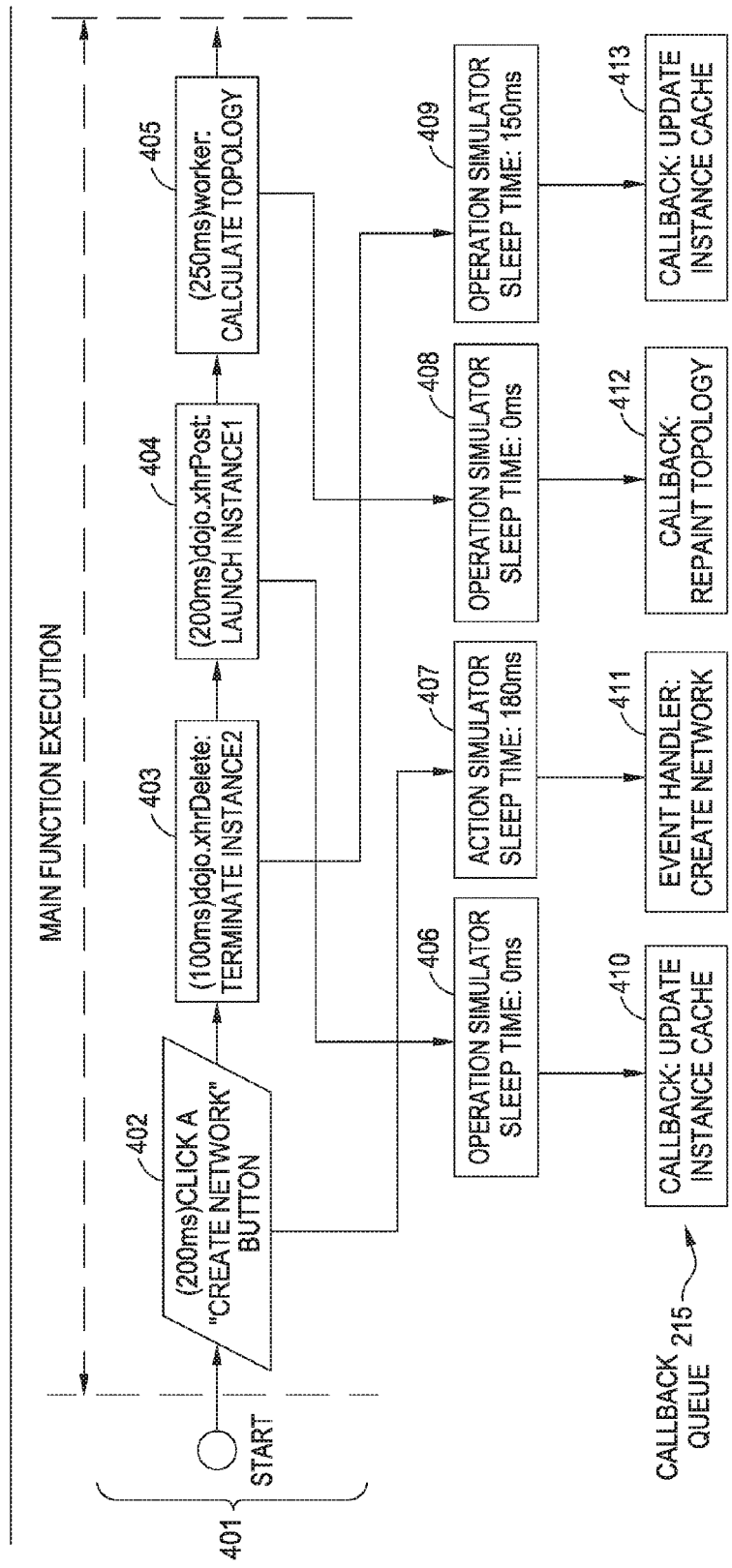

DETECTING ERRORS IN WEB APPLICATION RUNTIME ENVIRONMENTS

BACKGROUND

The present invention relates to computer software, and more specifically, to computer software which provides detects errors in web application runtime environments.

Users encounter any number and type of errors when interacting with web applications, or software applications in general. Errors in the source code of the web application cause many errors experienced by users. These errors in the source code must be corrected by developers to provide users with stable web applications. However, errors are often dependent on a particular system configuration, execution sequence, and/or sequence of user inputs. Therefore, developers often have difficulty in replicating the errors in the web applications experienced by the users.

SUMMARY

In one embodiment, a method comprises receiving a user action script, a first callback queue, and an asynchronous operation queue generated based on a first execution instance of a web application, simulating the first execution instance of the web application, comprising: invoking a second execution instance of the web application, simulating each user action of a plurality of user actions specified in the user action script, based on a plurality of callback functions specified in the first callback queue, simulating each asynchronous operation of a plurality of asynchronous operations specified in the asynchronous operation queue based on the plurality of callback functions specified in the first callback queue, and generating a second callback queue based on the simulated plurality of user actions and asynchronous operations; and upon determining that an order of the plurality of callback functions specified in the first callback queue matches an order of a plurality of callback functions specified in the second callback queue, returning an indication that the simulation of the first execution instance of the web application was successful.

In another embodiment, a system comprises a processor and a memory storing instructions, which when executed by the processor, performs an operation comprising receiving a user action script, a first callback queue, and an asynchronous operation queue generated based on a first execution instance of a web application, simulating the first execution instance of the web application, comprising: invoking a second execution instance of the web application, simulating each user action of a plurality of user actions specified in the user action script, based on a plurality of callback functions specified in the first callback queue, simulating each asynchronous operation of a plurality of asynchronous operations specified in the asynchronous operation queue based on the plurality of callback functions specified in the first callback queue, and generating a second callback queue based on the simulated plurality of user actions and asynchronous operations; and upon determining that an order of the plurality of callback functions specified in the first callback queue matches an order of a plurality of callback functions specified in the second callback queue, returning an indication that the simulation of the first execution instance of the web application was successful.

In another embodiment, a computer-readable storage medium has computer-readable program code embodied therewith, the computer-readable program code executable by a processor to perform an operation comprising receiving a user action script, a first callback queue, and an asynchronous operation queue generated based on a first execution instance of a web application, simulating the first execution instance of the web application, comprising: invoking a second execution instance of the web application, simulating each user action of a plurality of user actions specified in the user action script, based on a plurality of callback functions specified in the first callback queue, simulating each asynchronous operation of a plurality of asynchronous operations specified in the asynchronous operation queue based on the plurality of callback functions specified in the first callback queue, and generating a second callback queue based on the simulated plurality of user actions and asynchronous operations; and upon determining that an order of the plurality of callback functions specified in the first callback queue matches an order of a plurality of callback functions specified in the second callback queue, returning an indication that the simulation of the first execution instance of the web application was successful.

BRIEF DESCRIPTION OF THE SEVERAL VIEWS OF THE DRAWINGS

FIG. 1 is a schematic illustrating example executions of a web application in different environments, according to one embodiment.

FIG. 2, illustrates an example system which detects errors in web application runtime environments, according to one embodiment.

FIGS. 3A-3B depict example results of executing a web application in a runtime environment, according to various embodiments.

FIG. 4 depicts an example simulation of a web application in a second environment, according to one embodiment.

DETAILED DESCRIPTION

Figure 5:
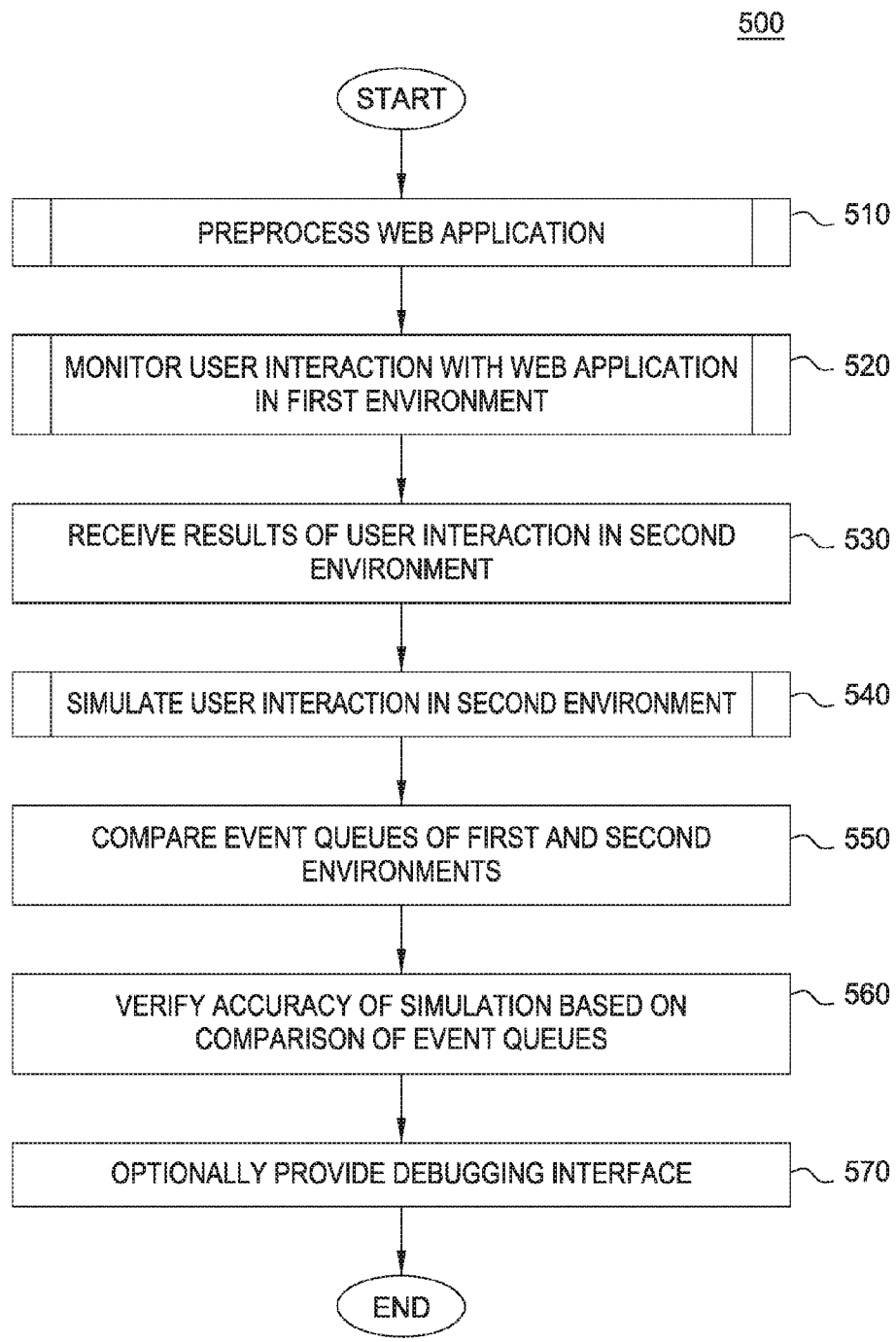
FIG. 5 is a flow chart illustrating an example method to detect errors in web application runtime environments, according to one embodiment.

Embodiments disclosed herein provide techniques to replicate web application errors in different environments. For example, a user may wish to register for a service provided by a web application executing in a customer environment. To do so, the user may complete a form provided by the web application and click a submit button on the form. However, the user may receive an indication of an error from the web application stating that the form was not properly submitted. The user may then contact a developer who supports the web application, and is tasked with debugging the web application in a development environment. However, the developer may not be able to recreate the error in the development environment, and therefore cannot debug the source code of the web application. To assist the developer in replicating the error, embodiments disclosed herein record user actions and callback functions in the customer environment. The recorded actions and callback functions can then be provided to simulators in the development environment. The simulators in the development environment may use the received information to time the sequence of user input and callback functions according to the corresponding sequence of user input and callback functions in the customer environment. Once the error is replicated in the development environment, the developer may then debug the source code.

FIG. 1 is a schematic 100 illustrating example executions of a web application in different environments, according to one embodiment. As shown, the schematic 100 depicts executions 101, 102 of the same web application, where execution 101 is in a first environment and execution 102 is in a second environment. In one embodiment, the first environment is a user environment, and the second environment is a development environment. However, the first and second environments are representative of any type of different computing environments.

As shown, each execution 101, 102 of the web application includes two portions, a main function execution 103 and an event queue execution 104. Generally, the main function execution 103 reflects a series of steps that include main functions of the web application and user interaction with the web application in the web browser. The event queue execution 104 reflects the execution of operations that are placed into the event queues 110, 116. Conventionally, web browsers only provide a single thread for processing JavaScript® functions (Javascript is a trademark of Oracle Corporation). However, asynchronous functions (such as "setTimeout" and "setInterval") provide a workaround for running background tasks, improving the performance of web applications. To do so, the single thread of execution (e.g., the main function execution 103) instructs the runtime to perform an asynchronous operation, providing a callback function as an argument. Generally, a callback function is executable code that is passed as an argument to another piece of executable code. The single thread of execution may then move on to another task. When the asynchronous operation completes, an event is enqueued along with the callback function. At some point in the future, the event is dequeued and the callback function executes (e.g., in the event queue execution 104). Because the callback function executes at a later, unknown time, the callback function may be referred to as an asynchronous callback function.

For example, as shown, the executions 101, 102 each begin with the web application sending an HTTP request at 100 milliseconds (ms), at blocks 105, 117 respectively. However, due to differences in the associated computing environments, the corresponding HTTP responses are not received at the same time. For example, the first computing environment (corresponding to execution 101) may have a faster network connection than the second computing environment (corresponding to execution 102 of the web application). Therefore, as shown at block 106, the execution 101 receives an HTTP response at 200 ms, while at block 119, the execution 102 receives the same HTTP response at 600 ms.

As shown, the executions 101, 102 include respective event queues 110, 116. Generally, an event queue stores user interaction callback functions and asynchronous operation callback functions for later execution during the event queue execution 104. User interaction callback functions are added to the event queues 110, 116 in response to user action. For example, as shown, in both executions 101, 102, the user clicks a button at 500 ms at blocks 107, 118, respectively. As such, the corresponding mouse click event handlers 112, 125 are added to the event queues 110, 116, respectively. Furthermore, the XHR callback functions 111, 126 are added to the event queues 110, 116 once the HTTP responses are received at blocks 106, 119.

However, as previously indicated, the execution time of asynchronous operations is not fixed due to different factors of each computing environment, such as network latency, CPU load, data size, and the like. Therefore, the order of events in the event queues 110, 116 are different. As shown, the XHR callback 112 is added to the event queue 110 before the mouse click event 112, while the mouse click event handler 125 is added to the event queue 116 before the XHR callback 126. This is because the HTTP response 106 of execution 101 took 100 ms to complete, while the HTTP response 119 of execution 102 took 500 ms to complete, due to the different technical features (e.g., different network latencies) of the respective computing environments. Additionally, when a user action occurs, the registered event handler is added to the event queue immediately. Conversely, when an asynchronous operation is invoked, the associated callback function is added to the event queue only when the asynchronous operation completes.

Furthermore, the event queue execution 104 executes the callback functions in the event queues 110, 116 in order. Therefore, in execution 101, the XHR callback is executed at block 108, while the mouse click callback is executed 100 ms later at block 109. However, in execution 102, the mouse click callback is executed at block 120, while the XHR callback is executed 100 ms later at block 121. Further complicating matters is when multiple callback functions handle the same data object, such as a global data structure or a document object model (DOM) tree. When multiple callback functions handle the same data object, the different execution order of the callback functions in the event queue 104 impacts the values of the shared data.

For example, as shown, execution 101 includes an example DOM tree 113, while execution 102 includes an example DOM tree 114. When the XHR callback is executed at block 108 of execution 101, "c" is added as a node 114 to the DOM tree 113. Furthermore, when the mouse click callback is executed at block 109 of execution 101, "b" is added as a node 115 to DOM tree 113. However, in execution 102, the callback functions are executed in reverse order, and the DOM tree 122 differs from DOM tree 113, even though the same operations occurred in both executions 101, 102. As shown, when the mouse click callback function is executed at block 120 of execution 102, "b" is added as node 123 to the DOM tree 122. Similarly, when the XHR callback function is executed at block 121 of execution 102, "c" is added to DOM tree 122 as node 124.

Therefore, if an error occurs in execution 101, a user may have difficulty recreating the error in execution 102, due to the timing in which asynchronous operations complete in each environment. Similarly, the timing impacts the event queues 110, 116, which impacts the values of shared data objects (e.g., the DOM trees 113, 122).

FIG. 2, illustrates an example system 200 which detects errors in web application runtime environments, according to one embodiment. As shown, the system 200 includes two example computing environments 201, 202. The computing environments 201, 202 may be any type of computing environments, from a single machine to a distributed cluster of machines. In one embodiment, the computing environment 201 corresponds to a customer runtime environment, and the computing environment 202 corresponds to a development environment. As shown, computing environment 201 includes a web browser 205 which executes a web application 220, while a simulator 206 is configured to simulate the execution of the web application 220 in the computing environment 202. Generally, the web application 220 is representative of any executable code for a web application. Furthermore, the source code of the web application 220 in the environment 201 is the same as the source code of the web application 220 in the environment 202 (e.g., both users interact with the same version of the web application 220).

As shown, the system 200 includes a callback scanner 203 and a module injector 204. The callback scanner 203 is configured to scan the code of the web application 220 to identify all callback functions that are associated with user actions and asynchronous operations in the code of the web application 220. Generally, the callback scanner 203 may identify callback functions based on a library of predefined callback functions and/or keywords. If the callback scanner 203 identifies a predefined callback function and/or keyword in the web application 220, the callback scanner 203 may store an indication of the callback function in the code of the web application 220.

The module injector 204 is configured to inject the user action recorder 206, asynchronous operation recorder 207, and callback recorder 208 into the web application 220 in environment 201. In at least one embodiment, the module injector 204 injects the recorders 206-208 by rewriting the source code of the web application 220. The module injector 204 is further configured to inject the user action simulator 212, asynchronous operation simulator 213, and callback recorder 206 into the web application 220 of environment 202.

The user action recorder 206 is a module configured to detect user actions performed in the browser 205, and store metadata for each user action in the user action script 209. For example, if the user enters text into a text box, the user action recorder 206 may store an indication of the text entry along with associated metadata (e.g., the text entered into the text box, an identifier of the text box, and the like) in the user action script 209. The asynchronous operation recorder 207 is a module configured to detect asynchronous operations triggered when executing the web application 220 in the browser 206. Responsive to detecting an asynchronous operation, the asynchronous operation recorder 207 may store metadata describing the asynchronous operation to the asynchronous operation queue 211. The callback recorder 208 is a module configured to detect user action event handler callback functions and asynchronous operation callback functions, and store metadata associated with the detected callback functions and event handlers in the callback queue 210. Generally, therefore, the callback recorder 208 records the execution sequence of callback functions (which include event handlers) in the callback queue 210.

The user action simulator 212 is a module configured to simulate the actions performed by the user of the browser 205 based on the records stored in the user action script 209 and the callback queue 210. The asynchronous operation simulator 213 simulates the asynchronous operations triggered by execution of the web application 220 in the browser 205 of environment 201 based on records in the callback queue 210 and the asynchronous operation queue 211. Generally, the user action simulator 212 and asynchronous operation simulator 213 simulate the respective user actions in the user action script 209 and the asynchronous operation queue 211 when these operations are "next" in the callback queue 210. If these actions are not listed as "next" in the callback queue 210, the user action simulator 212 and asynchronous operation simulator 213 "sleep" for a predefined amount of time, at which point the simulators 212, 213 again determine whether the associated actions are next in the callback queue 210.

As shown, the simulator 206 of environment 202 also includes an instance of the callback recorder 206. As in environment 201, the callback recorder 206 detects callback functions triggered by execution of the web application 220 in the simulator 206. However, for environment 202, the callback recorder 206 writes metadata describing detected callback functions in the callback queue 215. The comparator 216 of the simulator 206 is configured to compare the metadata stored in the callback queues 210, 215, to determine whether the execution sequence (including user actions, asynchronous operations, and callback functions) of the web application 220 was the same in environments 201, 202. If the data stored in the callback queues 210, 215 are different, the comparator 216 may return an indication to a user of the simulator 206 (e.g., a developer) that the attempted simulation was not accurate. However, if the data stored in the callback queues 210, 215 match (e.g., the order and type of operations reflected in the queues 210, 215 match), the comparator 216 may return an indication that the simulation in environment 202 accurately mirrored the execution of the web application 220 in environment 201. As such, a developer may be confident that the problem or error experienced in environment 201 has been recreated, and may begin debugging the web application 220.

FIG. 3A is a schematic 300 depicting example results of executing a web application in a runtime environment, according to various embodiments. As shown, the schematic 300 depicts an execution flow 301 (e.g., for the web application 220) including main function blocks 302-305. The execution flow 301 may correspond to executing a web application in a first environment, such as a user executing the web application 220 in a customer environment. As user actions and asynchronous operations are executed in the blocks 302-305, embodiments disclosed herein may add corresponding event handlers and callback functions 307-310 to an event queue 306. For example, when the user clicks a button provided by the web application 220 specifying to create a network at block 304, the associated event handler is added to the event queue 306 at block 308. Similarly, as shown at block 303, an asynchronous operation of "dojo.xhrPost: launch instance1" has a response time of 50 ms. Therefore, an associated callback function is added to the event queue 306 at block 307. Because the asynchronous operation completed at 150 ms of the execution flow 301, the associated callback is added to the event queue 306 at block 307, before the event handler at block 308, as the user clicked the "create network" button at 200 ms.

As shown, FIG. 3A also depicts an example user action script 209 and an example asynchronous operation queue 211. As shown, the user action script 209 includes metadata for three example user operations 311-313. The user operations 311-313 may correspond to the actions performed by the user in clicking the "create network" button at block 304. For example, as shown, the metadata of user operation 311 reflects the user entering text in the "networkName" field of a form provided by the web application 220, while user operation 312 reflects the user entering text in an "address" field of the form. User operation 313 reflects the user clicking the "create network" button.

As shown, the asynchronous operation queue 211 stores metadata attributes 314-317 for three example asynchronous operations of the execution flow 301 (e.g., blocks 302, 303, and 305). The metadata attributes of each asynchronous operation include a function 314, context 315, arguments 316, and a response 317. The function 314 specifies which programming function was invoked while the context 315 indicates where the function was invoked (and which file called the function). The arguments 316 specify which data was passed to the function, and the response 317 indicates the results returned by the function. Generally, the asynchronous operation recorder 207 may populate the data in the asynchronous operation queue 211 whenever an asynchronous operation is completed in the execution flow 301. Therefore, even though dojo.xhrDelete is initiated at block 302, prior to dojo.xhrPost at block 303, dojo.xhrDelete is added to the asynchronous operation queue 211 prior to dojo.xhrDelete based on the response time of dojo.xhrPost completing before the response time of dojo.xhrDelete in the execution flow 301.

FIG. 3B is a schematic 350 illustrating execution of events added to the event queue 306 during the application execution flow 301 of FIG. 3A, according to one embodiment. As shown, the application execution flow 301 includes blocks 352-355. The blocks 352-355 reflect execution of the corresponding events 307-310 in the event queue 306 of FIG. 3A. For example, block 352 corresponds to the callback function "updateInstanceCache" added to the event queue 306 at block 307, while block 353 corresponds to the user event handler "createNetwork" added to the event queue 306 at block 308. As shown, FIG. 3B also depicts the contents of an example callback queue 210. Generally, the callback recorder 208 may populate the callback queue 210 with metadata as the events 307-310 are processed by the web application 220.

As shown, the callback queue 210 includes an order column 356, a callback function column 357, a type column 358, a context column 359, a data column 360, and a timestamp column 361. The order column 361 corresponds to the order in which the events 307-310 are added to the event queue 306 during the execution flow 301. The callback function 357 specifies the callback function added to the event queue 306, while the type column 358 specifies the type of callback function (e.g., asynchronous operation or user action). The context 359 specifies a file which called the callback function and a line in the source code where the callback function call was made. The data 360 specifies any parameters passed to the callback function, and the timestamp 361 may correspond to a time when the callback function begins execution.

Therefore, FIGS. 3A-3B depict an example user action script 209, callback queue 210, and asynchronous operation queue created when a user interacts with the web application 220 in a first environment (e.g., a customer environment). The user action simulator 212 and asynchronous operation simulator 213 may leverage these objects to recreate the user interaction in a second environment to recreate an error or other issue experienced by the user during the user interaction. As described herein, a result of the simulation in the second environment may include the callback queue 215. The comparator 216 may then compare the callback queue 215 to the callback queue 210. If the callback queues 210, 215 include the same sequence of events, the comparator 216 may determine that the recreation of the user interaction was accurate, and the errors experienced by the user have likely been recreated.

FIG. 4 is a schematic 400 depicting an example simulation of a web application in a second environment, according to one embodiment. Generally, FIG. 4 depicts an execution flow 401 that simulates the execution flow 301 of FIGS. 3A-3B in a second environment (e.g., a development or support environment). In at least one embodiment, a user in the second environment (e.g. a developer) may open a browser in a development environment to load the web application 220. The developer may then run the user action script 209, user action simulator 212, and asynchronous operation simulator 213 to simulate the user's interaction with the web application 220 in the first environment. As the simulation proceeds, the callback recorder 208 in the second environment may detect callback functions and generate a callback queue 215 for the simulation.

As shown, the execution flow 401 includes blocks 402-405 as part of the main function execution of the web application 220. However, as shown, the order of the functions executed in blocks 402-405 differs with respect to the functions executed in blocks 302-305 of FIG. 3A. For example, the first function execution in flow 401 is the user click of the "create network" button at block 402. However, in flow 301, the user clicks the "create network" button at block 304, subsequent to blocks 302 and 303. Without a mechanism to reconcile this discrepancy, the developer may be unable to recreate the exact sequence of FIGS. 3A-3B.

Advantageously, however, the user action simulator 212 and asynchronous operation simulator 213 modify the timing of simulated user actions and asynchronous functions such that the execution flow 401 matches the execution flow 301. Generally, when the user action simulator 212 attempts to simulate a user action, the user action simulator 212 may first check the callback queue 210 to determine whether the current user action is the next operation to be performed (relative to other user actions and callback functions in the callback queue 210). In at least one embodiment, the user action simulator 212 identifies the callback function 357 in the callback queue 210 to identify a matching user action and the order 356 of the matching action. If the user action is not next in the callback queue 210, the user action simulator 212 sleeps for some amount of time, and checks after this time has elapsed. In at least one embodiment, the amount of time the user action simulator 212 sleeps is based on the timestamp 361 for the user action in the callback queue 210.

Similarly, before simulating an asynchronous operation, the asynchronous operation simulator 213 may reference the callback queue 210 to determine whether the next item in the callback queue 210. In addition, the asynchronous operation simulator 213 may further compare metadata of the current asynchronous operation to the metadata stored in the callback queue 210 before simulating the asynchronous operation. Specifically, the asynchronous operation simulator 213 may determine whether the name of the current asynchronous operation matches the callback function name 357 in the callback queue 210 and whether the operation type 358 in the callback queue 210 is an asynchronous operation. The asynchronous operation simulator 213 may also attempt to match other metadata attributes (such as the context 359 and data 360) before determining the current asynchronous operation has a match in the callback queue 210. Once the asynchronous operation simulator 213 finds a match in the callback queue 210, the asynchronous operation simulator 213 determines whether the identified callback function in the callback queue 210 is the next operation to be performed in the callback queue 210. If so, the asynchronous operation simulator 213 simulates the current asynchronous operation.

Therefore, as shown, at block 406, the asynchronous operation simulator 213 executes the callback function "updateInstanceCache" without sleeping, as "updateInstanceCache" is the first entry in the callback queue 210. Furthermore, at block 407, the user action simulator 212 may sleep for 180 milliseconds before simulating the user's click of the "create network" button (using the parameters provided by the user as captured in the user action script 209 and/or callback queue 210). Doing so allows the click of the "create network" button to occur subsequent to the simulation of "updateInstanceCache" in execution flow 401, matching the order of operations in execution flow 301. As the user action simulator 212 and asynchronous operation simulator 213 simulate user actions and asynchronous operations, the callback recorder 208 may populate the callback queue 215 with metadata describing each simulated user action and/or asynchronous operation at blocks 410-413. Although not pictured for the sake of clarity in FIG. 4, the format of the callback queue 215 mirrors the format of the callback queue 210 depicted in FIG. 3B. Once the callback queue 215 is created and the simulation completes, the comparator 216 may compare the callback queues 210, 215 to determine whether the order of entries in the queues 210, 215 match. If the order (and optionally one or more metadata attributes 356-361) match, the comparator 216 may return an indication that the second environment accurately simulated the execution of the web application 220 in the first environment.

FIG. 5 is a flow chart illustrating an example method 500 to detect errors in web application runtime environments, according to one embodiment. As shown, the method 500 begins at block 510, where a web application (e.g., the web application 220) is preprocessed to facilitate the detection of errors. Generally, in preprocessing the web application 220, the callback scanner 203 may identify callback functions, user action event handlers, and asynchronous functions in the source code of the web application. Furthermore, the module injector 204 may inject the user action recorder 206, asynchronous operation recorder 207, and callback recorder 208 to the source code of an user deployment of the web application 220 (e.g., in a customer environment), while injecting the user action simulator 212, asynchronous operation simulator 213, and the callback recorder 208 to the source code a developer deployment of the web application 220 (e.g., in a development environment). In some embodiments, however, the recorders 206-208 and simulators 212-213 may be injected in the user and developer deployments of the source code of the web application 220. In at least one embodiment, a user may initially execute the web application 220 in a web browser, perform some operations in the web browser, and experience at least one error. In such embodiments, the user may turn on an "error detection" mode in their web browser, which triggers the preprocessing of the web application 220 at block 510.

At block 520, described in greater detail with reference to FIG. 7, the user action recorder 206, asynchronous operation recorder 207, and callback recorder 208 may monitor the user's interaction with the preprocessed web application 220 in a first environment (e.g., the customer environment). Generally, at block 520, the recorders 206-208 identify metadata describing user actions, the requests and responses of asynchronous operations, and callback functions as the web application 220 executes. Doing so allows the recorders 206-208 to generate the user action script 209, the callback queue 210, and asynchronous operation queue 211 for use in the development environment as part of a simulation of the user interaction with the web application 220. At block 530, a deployment of the preprocessed web application 220 may receive the results of user interaction in a second environment (e.g., a development environment). For example, the deployment of the preprocessed web application 220 in the second environment may receive the user action script 209, the callback queue 210, and asynchronous operation queue 211 generated at block 520. At block 540, the user action simulator 212, asynchronous operation recorder 213, and the callback recorder 208 may simulate the user interaction with the web application 220 in the second environment (e.g., the development environment). In at least one embodiment, a developer may optionally enable the error detection mode before simulating the user interaction at block 540. Generally, at block 540, the user action simulator 212 and asynchronous operation simulator 213 time the sequence of user actions, asynchronous operations, and callback functions to properly match the corresponding sequence experienced by the user at block 520 during the user interaction. As part of the simulation, the callback recorder 208 generates the callback queue 215 which reflects the order in which callback functions are executed during the simulation.

At block 550, the comparator 216 may compare the event queues 210, 215. Generally, the comparator 216 determines whether the entries in the event queues 210, 215 depict the same sequence of callback functions. For example, if a mouse click event handler is prior to an asynchronous callback function in the event queue 210, the comparator 216 may determine whether the mouse click event handler occurs prior to the callback function in the event queue 215. At block 560, the comparator 216 may verify the accuracy of the simulation based on the comparison of event queues 210, 215. For example, if the event queue 215 lists the callback function as occurring prior to the mouse click event handler, the comparator 216 may return an indication that the simulation failed. However, if the event queue 215 lists execution of the mouse click event handler as occurring prior to execution of the callback function, and the execution of all other event handlers and callback functions are in proper order, the comparator 216 may return an indication that the simulation was accurate. At block 570, a debugging interface may optionally be provided to the developer, allowing the developer to debug the web application 220 to correct the errors experienced by the user.

Figure 6:
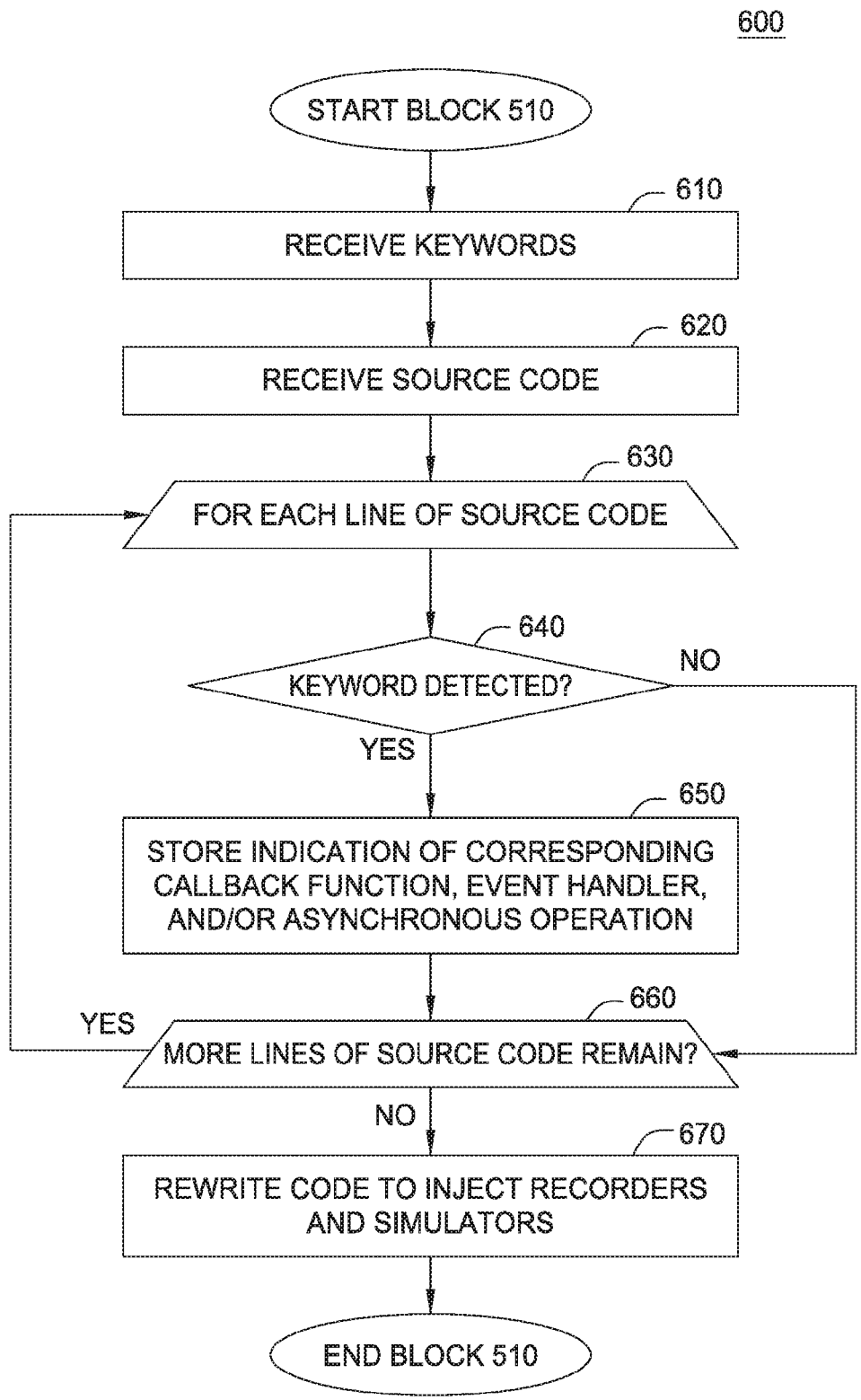
FIG. 6 is a flow chart illustrating an example method to preprocess a web application, according to one embodiment.

FIG. 6 is a flow chart illustrating an example method 600 corresponding to block 510 to preprocess a web application, according to one embodiment. As shown, the method 610 begins at block 610, where the callback scanner 203 receives a library of keywords used to identify callback functions, user action event handlers, and/or asynchronous operations. The library may generally include function names that are known to be associated with callback functions, user action event handlers, and/or asynchronous operations. When the callback scanner 203 encounters these keywords in the source code, the callback scanner 203 may determine that a corresponding object has been detected. At block 620, the callback scanner 203 may receive the source code of the web application 220. At block 630, the callback scanner 203 executes a loop including blocks 640-660 for each line of the source code of the web application 220. At block 640, the callback scanner 203 determines whether one of the keywords is present in the current line of code. For example, if a keyword is "xhrPost," the callback scanner 203 may determine whether "xhrPost" appears in the current line of code. In at least one embodiment, the callback scanner 203 may use a regular expression to determine whether the keywords (or similar variants thereof) are present in the current line of code. If no keywords are present, the method proceeds to block 660. If one or more keywords are detected, the method proceeds to block 650.

At block 650, the callback scanner 203 stores an indication of the callback functions, user action event handlers, and/or asynchronous operations associated with the keywords detected at block 640. The indication may include the current line of code, the keywords, and the callback functions, user action event handlers, and/or asynchronous operations. At block 660, the callback scanner 203 determines whether additional lines of source code remain in the web application 220. If more lines of code remain, the method returns to block 610. Otherwise, the method proceeds to block 670, where the module injector 204 rewrites the source code of the web application 220 to inject the user action recorder 206, asynchronous operation recorder 207, callback recorder 208, user action simulator 212, and asynchronous operation simulator 213 in the source code of the web application 220. In at least one embodiment, the module injector 204 leverages the results of the callback scanner 203 to modify the source code of the web application 220. For example, if the callback scanner 203 detects a callback function at line 23 of the code, the module injector 204 may configure the callback recorder 208 to monitor executions of line 23 of the code during runtime, allowing the callback recorder 208 to record metadata of the callback function in the callback queue 210 (and/or callback queue 215).

Figure 7:
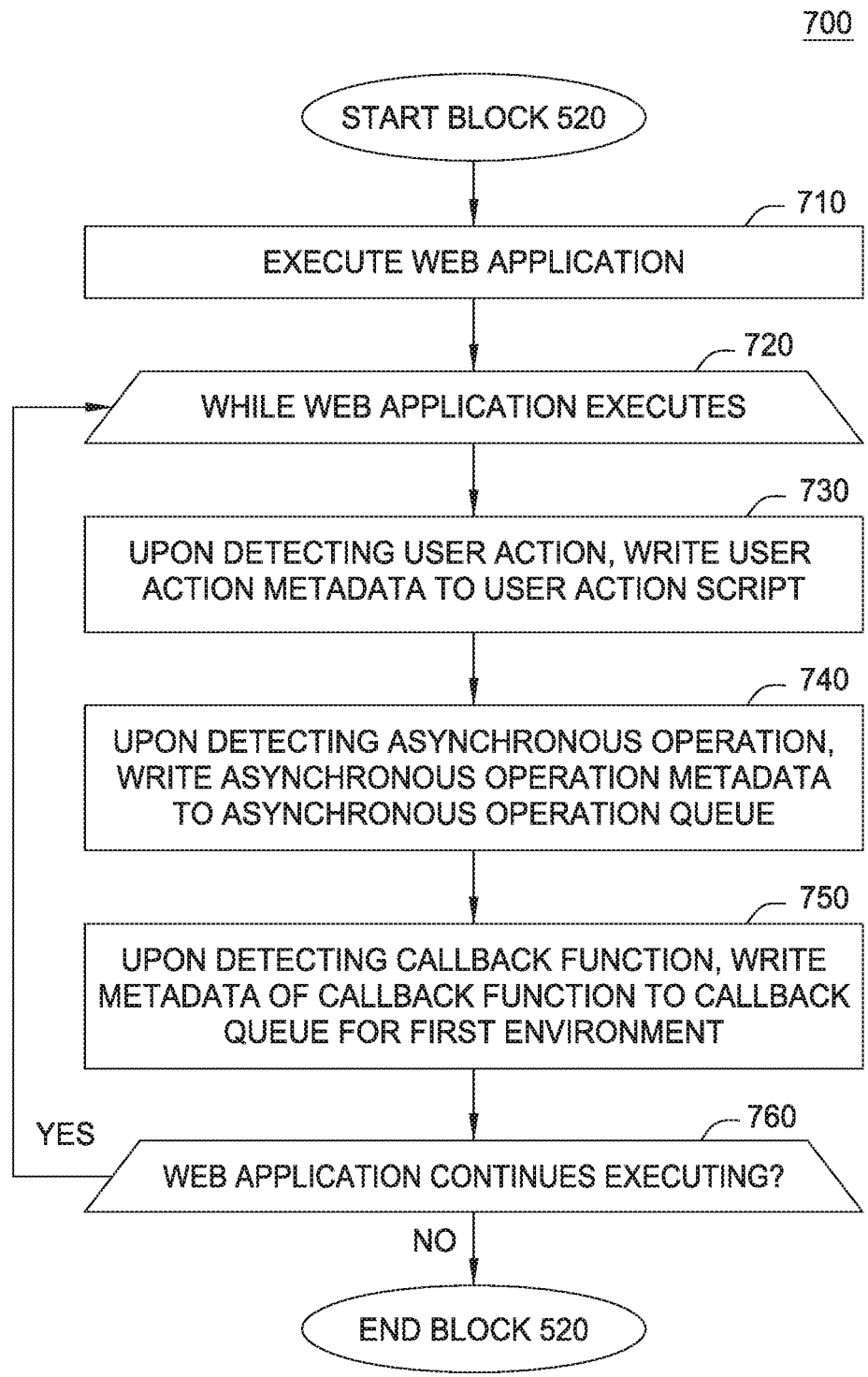
FIG. 7 is a flow chart illustrating an example method to monitor user interaction with a web application in a first environment, according to one embodiment.

FIG. 7 is a flow chart illustrating an example method 700 corresponding to block 520 to monitor user interaction with a web application in a first environment, according to one embodiment. Generally, the steps of the method 700 monitor the execution of a web application to identify any user actions, asynchronous operations, and callback functions, as a user interacts with the executing web application. As shown, the method 700 begins at block 710, where the web application (e.g., the web application 220) is executed in a web browser in a customer environment. At block 720, a loop including blocks 730-760 is executed while the web application 220 executes. At block 730, the user action recorder 206 may write user action metadata to the user action script 209 upon detecting user action in the web browser executing the web application 220. For example, if the user clicks a mouse button, the user action recorder 206 may generate metadata describing, the mouse click, which button was clicked, which object was clicked, and the like. The user action recorder 206 may then store the generated metadata in the user action script 209.

At block 740, the asynchronous operation recorder 207 may detect an asynchronous operation during execution of the web application 220, and write metadata describing the detected asynchronous operation in the asynchronous operation queue 211. For example, the asynchronous operation recorder 207 may record metadata describing the detected function, context, arguments, and responses to the asynchronous operation queue 211, as depicted in FIG. 3A. At block 750, the callback recorder 208 may detect a callback function being placed in the event queue of the web application 220, and write metadata describing the callback function in the callback queue 210. In at least one embodiment, the metadata includes the order, detected callback function, callback function type (e.g., asynchronous operation or user action), a context, data parameters, and timestamp, as depicted in FIG. 3B. At block 760, if the web application 220 continues executing, the method returns to block 720. If the web application 220 does not continue executing (e.g., execution completes, or an error/failure occurs), the method 700 ends.

Figure 8:
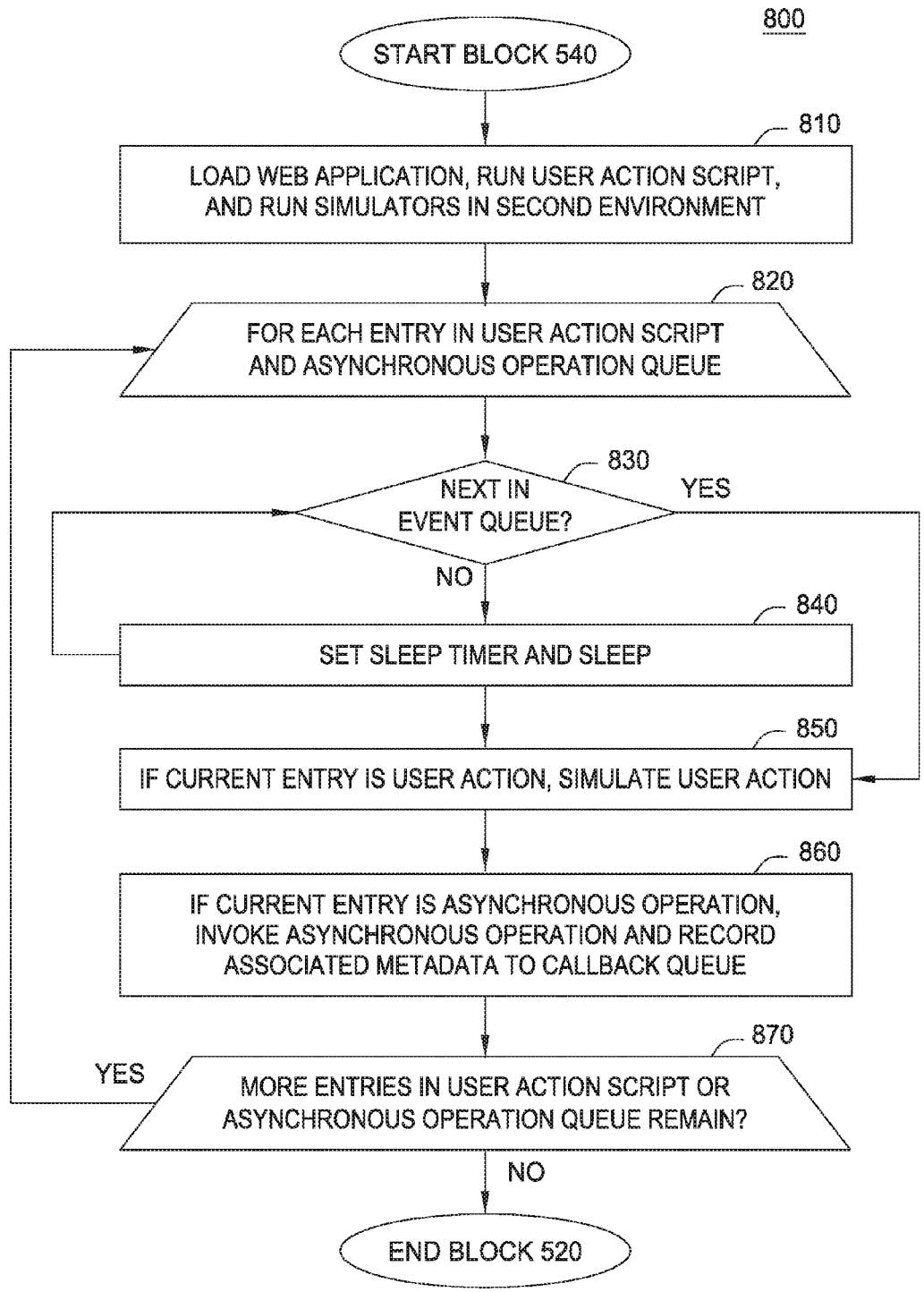
FIG. 8 is a flow chart illustrating an example method to simulate user interaction with a web application in a second environment, according to one embodiment.

FIG. 8 is a flow chart illustrating an example method 800 corresponding to block 540 to simulate user interaction with a web application in a second environment, according to one embodiment. As shown, the method 800 begins at block 810, where a user (e.g. a developer) may load the web application 220, run the user action script, and run the simulators 212-213 in a second environment (e.g. a development environment). At block 820, a loop including blocks 830-870 is executed for each entry in the user action script 209 and the asynchronous operation queue 211. At block 830, the user action simulator 212 or asynchronous operation simulator 213, as the case may be, determines whether the current user action or asynchronous operation is next in the event queue 210 (e.g., is the next entry in the event queue 210 that has not been simulated). If the current user action or asynchronous operation is not next in the event queue, the method proceeds to block 840. At block 840, the user action simulator 212 or asynchronous operation simulator 213, as the case may be, sets a timer and sleeps (e.g., does not simulate the current user action or asynchronous operation).

Returning to block 830, if the current user action or asynchronous operation is next in the event queue, the method proceeds to block 850. At block 850, if the current user action or asynchronous operation is a user action, the user action simulator 212 simulates the user action. For example, if the current user action is clicking a URL, the user action simulator 212 simulates the user action of clicking the URL, and the target resource may be processed by the web application 220. At block 860, if the current user action or asynchronous operation is an asynchronous operation, the asynchronous operation simulator 213 simulates the asynchronous operation (e.g., invokes the associated function), and records metadata to the callback queue 215. The metadata stored in the callback queue 215 may include metadata describing the detected function, context, arguments, and responses. At block 870, the user action simulator 212 and/or asynchronous operation simulator 213 determine whether more entries remain in the user action script 209 or the asynchronous operation queue 211. If more user actions or asynchronous operations remain, the method returns to block 820. Otherwise, the method 800 ends.

Figure 9:
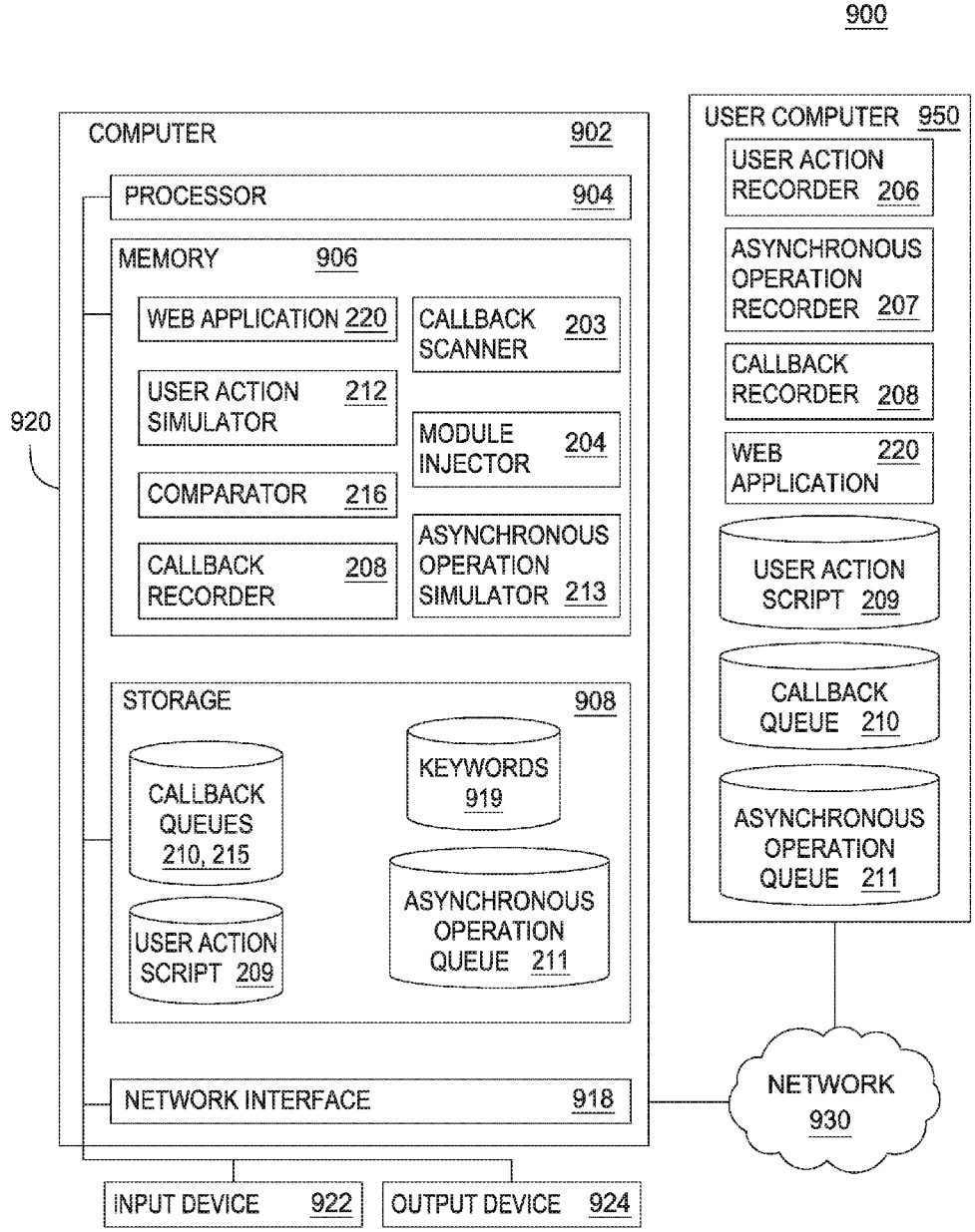
FIG. 9 illustrates an example system which detects errors in web application runtime environments, according to one embodiment.

FIG. 9 illustrates an example system 900 which detects errors in web application runtime environments, according to one embodiment. The networked system 900 includes a computer 902. The computer 902 may also be connected to other computers via a network 930. In general, the network 930 may be a telecommunications network and/or a wide area network (WAN). In a particular embodiment, the network 930 is the Internet.

The computer 902 generally includes a processor 904 which obtains instructions and data via a bus 920 from a memory 906 and/or a storage 908. The computer 902 may also include one or more network interface devices 918, input devices 922, and output devices 924 connected to the bus 920. The computer 902 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 904 is a programmable logic device that performs instruction, logic, and mathematical processing, and may be representative of one or more CPUs. The network interface device 918 may be any type of network communications device allowing the computer 902 to communicate with other computers via the network 930.

The storage 908 is representative of hard-disk drives, solid state drives, flash memory devices, optical media and the like. Generally, the storage 908 stores application programs and data for use by the computer 902. In addition, the memory 906 and the storage 908 may be considered to include memory physically located elsewhere; for example, on another computer coupled to the computer 902 via the bus 920.

The input device 922 may be any device for providing input to the computer 902. For example, a keyboard and/or a mouse may be used. The input device 922 represents a wide variety of input devices, including keyboards, mice, controllers, and so on. Furthermore, the input device 922 may include a set of buttons, switches or other physical device mechanisms for controlling the computer 902. The output device 924 may include output devices such as monitors, touch screen displays, and so on.

As shown, the memory 906 contains the callback scanner 203, module injector 204, callback recorder 208, user action simulator 212, asynchronous operation simulator 213, comparator 216, web application 220, all described in greater detail above. As shown, the storage 908 contains the callback queue 210, the callback queue 215, user action script 209, and asynchronous operation queue 211, all described in greater detail above. Furthermore, the storage 908 includes the keywords 919. The keywords 919 include predefined and user-defined keywords used by the callback scanner 203 to identify callback functions and asynchronous operations in the source code of the web application 220.

As shown, a user computer 950 includes the web application 220, user action recorder 206, asynchronous operation recorder 207, callback recorder 208, user action script 209, callback queue 210, all described in greater detail above. Generally, a user of the computer 950 may execute the web application 220 in a web browser (not pictured). During execution of the web application 220, the user action recorder 206 may record metadata describing the user actions to the user action script 209. Similarly, the callback recorder 208 may record metadata describing callback functions in the callback queue 210, while the asynchronous operation recorder records metadata describing asynchronous operations in the asynchronous operation queue 211. The computer 902 may receive the user action script 209, callback queue 210, and asynchronous operation queue 211 to simulate the user's interaction with the web application 220 on the computer 902, allowing a developer to recreate any errors experienced by the user of the computer 950.

Advantageously, embodiments disclosed herein provide techniques to remotely and accurately reproduce a user's experience with a web application. Specifically, embodiments disclosed herein record user action metadata, callback function metadata, and asynchronous operation metadata as the user interacts with a web application. The metadata may then be provided to a development platform, which uses the metadata to accurately reproduce the sequence of events as they occurred in the user environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the user action recorder 206 could execute on a computing system in the cloud. In such a case, the user action recorder 206 may store the user action script 209 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    receiving a user action script, a first callback queue, and an asynchronous operation queue generated based on a first execution instance of a web application in a first computing environment;
    simulating, by operation of a computer processor, the first execution instance of the web application, comprising:
        invoking a second execution instance of the web application in a second computing environment, different than the first computing environment;
        simulating, during the second execution instance of the web application, each user action of a plurality of user actions specified in the user action script, based on a plurality of callback functions specified in the first callback queue;
simulating, during the second execution instance of the web application, each asynchronous operation of a plurality of asynchronous operations specified in the asynchronous operation queue based on the plurality of callback functions specified in the first callback queue; and
generating, during the second execution instance of the web application, a second callback queue based on the simulated plurality of user actions and asynchronous operations; and
upon determining that an order of the plurality of callback functions specified in the first callback queue matches an order of a plurality of callback functions specified in the second callback queue, returning an indication that the simulation of the first execution instance of the web application was successful.

2. The method of claim 1, further comprising:
detecting each of the plurality of user actions during the first execution instance of the web application;
generating the user action script during the first execution instance of the web application by storing, in the user action script, metadata describing each of the plurality of user actions detected during the first execution instance of the web application;
detecting each of the plurality of asynchronous operations invoked during the first execution instance of the web application;
generating the asynchronous operation queue during the first execution instance of the web application by storing, in the asynchronous operation queue, metadata describing each of the plurality of asynchronous operations detected during the first execution instance of the web application;
detecting each of the plurality of callback functions invoked during the first execution instance of the web application; and
generating the first callback queue during the first execution instance of the web application by storing, in the first callback queue, metadata describing each of the plurality of callback functions detected during the first execution instance of the web application, wherein the plurality of callback functions comprise one of asynchronous operation callback functions and registered user event handlers.

3. The method of claim 1, further comprising:
preprocessing a source code of the web application by:
identifying each instance of one of the plurality of callback functions in the source code based on a set of keywords; and
injecting, in the source code: (i) a first module to detect user actions and generate the user action script, (ii) a second module to detect callback functions and generate the first callback queue, (iii) a third module to detect asynchronous operations and generate the asynchronous operation queue, (iv) a fourth module to simulate the user actions, and (v) a fifth module to simulate the asynchronous operations.

4. The method of claim 1, wherein simulating each of the plurality of asynchronous operations comprises:
upon determining that a most recent entry in the callback queue is associated with the respective asynchronous operation, simulating the respective asynchronous operation; and
upon determining that the most recent entry in the callback queue is not associated with the respective asynchronous operation:
delaying simulation of the respective asynchronous operation for a predefined amount of time; and
upon determining that the predefined amount of time has lapsed:
determining that the most recent entry in the callback queue is associated with the respective asynchronous operation; and
simulating the respective asynchronous operation.

5. The method of claim 1, wherein simulating each of the plurality of user actions comprises:
upon determining that a most recent entry in the callback queue is associated with the respective user action, simulating the respective user action; and
upon determining that the most recent entry in the callback queue is not associated with the respective user action:
delaying simulation of the respective user action for a predefined amount of time; and
upon determining that the predefined amount of time has lapsed:
determining that the most recent entry in the callback queue is associated with the respective user action; and
simulating the respective user action.

6. The method of claim 1, further comprising:
upon determining that the order of the plurality of callback functions specified in the first callback queue does not match the order of the plurality of callback functions specified in the second callback queue, returning an indication that the simulation of the first execution instance of the web application was not successful.

7. A computer program product, comprising:
a non-transitory computer-readable storage medium having computer readable program code embodied therewith, the computer readable program code executable by a processor to perform an operation comprising:
receiving a user action script, a first callback queue, and an asynchronous operation queue generated based on a first execution instance of a web application;
simulating the first execution instance of the web application, comprising:
invoking a second execution instance of the web application;
simulating, during the second execution instance of the web application, each user action of a plurality of user actions specified in the user action script, based on a plurality of callback functions specified in the first callback queue;
simulating, during the second execution instance of the web application, each asynchronous operation of a plurality of asynchronous operations specified in the asynchronous operation queue based on the plurality of callback functions specified in the first callback queue; and
generating, during the second execution instance of the web application, a second callback queue based on the simulated plurality of user actions and asynchronous operations; and
upon determining that an order of the plurality of callback functions specified in the first callback queue does not match an order of a plurality of callback functions specified in the second callback queue, returning an indication that the simulation of the first execution instance of the web application was not successful.

8. The computer program product of claim 7, the operation further comprising:
    detecting each of the plurality of user actions during the first execution instance of the web application;
    generating the user action script during the first execution instance of the web application by storing, in the user action script, metadata describing each of the plurality of user actions detected during the first execution instance of the web application;
    detecting each of the plurality of asynchronous operations invoked during the first execution instance of the web application;
    generating the asynchronous operation queue during the first execution instance of the web application by storing, in the asynchronous operation queue, metadata describing each of the plurality of asynchronous operations detected during the first execution instance of the web application;
    detecting each of the plurality of callback functions invoked during the first execution instance of the web application; and
    generating the first callback queue during the first execution instance of the web application by storing, in the first callback queue, metadata describing each of the plurality of callback functions detected during the first execution instance of the web application, wherein the plurality of callback functions comprise one of asynchronous operation callback functions and registered user event handlers.

9. The computer program product of claim 7, the operation further comprising:
    preprocessing a source code of the web application by:
        identifying each instance of one of the plurality of callback functions in the source code based on a set of keywords; and
        injecting, in the source code: (i) a first module to detect user actions and generate the user action script, (ii) a second module to detect callback functions and generate the first callback queue, (iii) a third module to detect asynchronous operations and generate the asynchronous operation queue, (iv) a fourth module to simulate the user actions, and (v) a fifth module to simulate the asynchronous operations.

10. The computer program product of claim 7, wherein simulating each of the plurality of asynchronous operations comprises:
    upon determining that a most recent entry in the callback queue is associated with the respective asynchronous operation, simulating the respective asynchronous operation; and
    upon determining that the most recent entry in the callback queue is not associated with the respective asynchronous operation:
        delaying simulation of the respective asynchronous operation for a predefined amount of time; and
        upon determining that the predefined amount of time has lapsed:
            determining that the most recent entry in the callback queue is associated with the respective asynchronous operation; and
            simulating the respective asynchronous operation.

11. The computer program product of claim 7, wherein simulating each of the plurality of user actions comprises:
    upon determining that a most recent entry in the callback queue is associated with the respective user action, simulating the respective user action; and
    upon determining that the most recent entry in the callback queue is not associated with the respective user action:
        delaying simulation of the respective user action for a predefined amount of time; and
        upon determining that the predefined amount of time has lapsed:
            determining that the most recent entry in the callback queue is associated with the respective user action; and
            simulating the respective user action.

12. The computer program product of claim 7, wherein the first execution instance of the web application occurs in a first computing environment, wherein the second execution instance of the web application occurs in a second computing environment, different from the first computing environment.

13. A system, comprising:
    a processor; and
    a memory storing one or more instructions which, when executed by the processor, performs an operation comprising:
        receiving a user action script, a first callback queue, and an asynchronous operation queue generated based on a first execution instance of a web application;
        simulating the first execution instance of the web application, comprising:
            invoking a second execution instance of the web application;
            simulating, during the second execution instance of the web application, each user action of a plurality of user actions specified in the user action script, based on a plurality of callback functions specified in the first callback queue;
            simulating, during the second execution instance of the web application, each asynchronous operation of a plurality of asynchronous operations specified in the asynchronous operation queue based on the plurality of callback functions specified in the first callback queue; and
            generating, during the second execution instance of the web application, a second callback queue based on the simulated plurality of user actions and asynchronous operations; and
            upon determining that an order of the plurality of callback functions specified in the first callback queue does not match an order of a plurality of callback functions specified in the second callback queue, returning an indication that the simulation of the first execution instance of the web application was not successful.

14. The system of claim 13, the operation further comprising: detecting each of the plurality of user actions during the first execution instance of the web application;
    generating the user action script during the first execution instance of the web application by storing, in the user action script, metadata describing each of the plurality of user actions detected during the first execution instance of the web application;
    detecting each of the plurality of asynchronous operations invoked during the first execution instance of the web application;
    generating the asynchronous operation queue during the first execution instance of the web application by storing, in the asynchronous operation queue, metadata describing each of the plurality of asynchronous operations detected during the first execution instance of the web application;

detecting each of the plurality of callback functions invoked during the first execution instance of the web application; and generating the first callback queue during the first execution instance of the web application by storing, in the first callback queue, metadata describing each of the plurality of callback functions detected during the first execution instance of the web application, wherein the plurality of callback functions comprise one of asynchronous operation callback functions and registered user event handlers.

15. The system of claim 13, the operation further comprising:

preprocessing a source code of the web application by:
identifying each instance of one of the plurality of callback functions in the source code based on a set of keywords; and
injecting, in the source code: (i) a first module to detect user actions and generate the user action script, (ii) a second module to detect callback functions and generate the first callback queue, (iii) a third module to detect asynchronous operations and generate the asynchronous operation queue, (iv) a fourth module to simulate the user actions, and (v) a fifth module to simulate the asynchronous operations.

16. The system of claim 13, wherein simulating each of the plurality of asynchronous operations comprises:

upon determining that a most recent entry in the callback queue is associated with the respective asynchronous operation, simulating the respective asynchronous operation; and upon determining that the most recent entry in the callback queue is not associated with the respective asynchronous operation:
delaying simulation of the respective asynchronous operation for a predefined amount of time; and
upon determining that the predefined amount of time has lapsed:
determining that the most recent entry in the callback queue is associated with the respective asynchronous operation; and
simulating the respective asynchronous operation.

17. The system of claim 13, wherein simulating each of the plurality of user actions comprises:

upon determining that a most recent entry in the callback queue is associated with the respective user action, simulating the respective user action; and upon determining that the most recent entry in the callback queue is not associated with the respective user action:
delaying simulation of the respective user action for a predefined amount of time; and
upon determining that the predefined amount of time has lapsed:
determining that the most recent entry in the callback queue is associated with the respective user action; and
simulating the respective user action.

18. The system of claim 13, wherein the first execution instance of the web application occurs in a first computing environment, wherein the second execution instance of the web application occurs in a second computing environment, different from the first computing environment.

* * * * *